United States Patent
Matsuura et al.

(10) Patent No.: US 10,581,350 B2
(45) Date of Patent: Mar. 3, 2020

(54) SYNCHRONOUS MACHINE CONTROL DEVICE AND METHOD OF CONTROLLING THE SYNCHRONOUS MACHINE CONTROL DEVICE

(71) Applicant: Mitsubishi Electric Corporation, Tokyo (JP)

(72) Inventors: Daiki Matsuura, Tokyo (JP); Noriyuki Wada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/954,883

(22) Filed: Apr. 17, 2018

(65) Prior Publication Data

US 2018/0351486 A1 Dec. 6, 2018

(30) Foreign Application Priority Data

Jun. 1, 2017 (JP) .................. 2017-109003

(51) Int. Cl.
| | |
|---|---|
| H02P 6/04 | (2016.01) |
| H02P 6/20 | (2016.01) |
| H02M 1/36 | (2007.01) |
| H02P 3/18 | (2006.01) |
| H02P 5/74 | (2006.01) |
| H02M 3/155 | (2006.01) |
| H02M 7/5387 | (2007.01) |
| H02M 3/158 | (2006.01) |
| H02M 1/00 | (2006.01) |

(52) U.S. Cl.
CPC ............... *H02P 6/20* (2013.01); *H02M 1/36* (2013.01); *H02P 3/18* (2013.01); *H02P 5/74* (2013.01); *H02M 3/155* (2013.01); *H02M 3/158* (2013.01); *H02M 3/1584* (2013.01); *H02M 7/5387* (2013.01); *H02M 2001/007* (2013.01); *H02P 2207/05* (2013.01)

(58) Field of Classification Search
CPC ............ H02P 6/20; H02M 1/36; H02M 3/155
USPC ...................................... 318/400.11
See application file for complete search history.

(56) References Cited

U.S. PATENT DOCUMENTS

| | | | |
|---|---|---|---|
| 2014/0217941 A1* | 8/2014 | Yamada | B60L 15/02 318/400.26 |
| 2015/0244301 A1* | 8/2015 | Sato | H02P 27/06 318/139 |

FOREIGN PATENT DOCUMENTS

JP 2008-154371 A 7/2008

\* cited by examiner

*Primary Examiner* — Eduardo Colon Santana
*Assistant Examiner* — Gabriel Agared
(74) *Attorney, Agent, or Firm* — Sughrue Mion, PLLC; Richard C. Turner; David P. Emery

(57) ABSTRACT

Provided are a synchronous machine control device SMCD including a converter configured to boost a voltage of a direct current power source DCPS in which, when the SMCD returns to operation after the operation stopping, fail-proof return to operation through the prevention of damage to the DCPS and the shortening of the time required for the return to operation are balanced. When returning to operation, the SMCD issues an operation enable command to an inverter and the converter simultaneously in the case where a calculated electric power value calculated from a rotational speed and a torque command is equal or higher than a threshold and, in the case where the calculated electric power value is less than the threshold, issues an operation enable command to the converter after an operation command that makes the electric power of the inverter equal or higher than a threshold is issued.

6 Claims, 7 Drawing Sheets

SYNCHRONOUS MACHINE CONTROL DEVICE AND METHOD OF CONTROLLING THE SYNCHRONOUS MACHINE CONTROL DEVICE

BACKGROUND OF THE INVENTION

1. Field of the Invention

The present invention relates to a synchronous machine control device including electric power conversion means and being configured to drive the rotation of a synchronous machine, and to a method of controlling the synchronous machine control device.

2. Description of the Related Art

A synchronous machine control device supplies power to a synchronous machine by converting the voltage of a direct current power source into an alternating current voltage with the use of an inverter. Some synchronous machine control devices include a converter installed to supply power to an inverter by boosting the voltage of a direct current power source, in order to improve efficiency (see Japanese Patent Application Laid-open No. 2008-154371, for example).

In a case where the thus configured synchronous machine control device returns to operation, for example, when regenerative operation of the inverter is started before the converter starts operating, electric charges accumulate in a capacitor inside the converter, which has a possibility of causing overvoltage. To give another example, when the converter starts operating while the synchronous machine is operating at a high rotational speed and the operation of the inverter is stopped, the inverter falls into a full wave rectification state, thereby causing a regenerative current to flow into the direct current power source. The flow of regenerative current has a possibility of damaging the direct current power source when a battery is charged to full capacity.

As a method of preventing this overvoltage or damage to the direct current power source when the synchronous machine control device returns to operation, return processing is executed by first putting the inverter into operation with the regenerative operation of the inverter prohibited, and then starting the operation of the converter. Regenerative operation is not executed in the inverter during the period prior to the start of the converter's operation, and hence there is no accumulation of electric charges in a smoothing capacitor, which is provided in the converter to smooth out a voltage between terminals of the inverter, and overvoltage can accordingly be prevented. With the converters operation started after the inverter reaches a state that is not a regenerative state, damage to the direct current power source can be prevented as well.

As described above, when the synchronous machine control device of the related art in which a converter configured to boost the voltage of the direct current power source is included returns to operation, the inverter is put into operation with the regenerative operation of the inverter prohibited, and then the converter is put into operation in order to prevent, for example, a flow of regenerative current while the battery is in a fully charged state. It is therefore not until the converter's operation is started that the regenerative operation of the inverter is allowed to be executed, which means that the return to operation takes long when the desired operation of the inverter is regenerative operation. On the other hand, there is no accumulation of electric charges in the smoothing capacitor provided in the converter to smooth out the voltage between the terminals of the inverter and, accordingly, no overvoltage is caused when one of a plurality of inverters connected is in regenerative operation, if the total electric power of the inverters is 0 or larger. The method of the related art may consequently make the length of time to return to desired operation longer than necessary by prohibiting the regenerative operation even when the prohibition of the regenerative operation is unnecessary.

SUMMARY OF THE INVENTION

The present invention has been made to solve this problem, and an object of the present invention is therefore to provide a synchronous machine control device including a converter configured to boost the voltage of a direct current power source in which, when the synchronous machine control device returns to operation after the operation is stopped, fail-proof return to operation through the prevention of damage to the direct current power source and the shortening of the time required for the return to operation are balanced, and a method of controlling the synchronous machine control device.

According to one embodiment of the present invention, there is provided a synchronous machine control device including: a converter configured to boost a direct current voltage; at least one inverter configured to supply power to a synchronous machine by converting the boosted direct current voltage into an alternating current voltage; and a control unit configured to control the converter and the at least one inverter, in which the control unit includes an integrated control unit configured to switch, when the converter and the at least one inverter are to start operating, an order in which operation of the converter and operation of the at least one inverter are started, and in which the integrated control unit is configured to perform control, when the converter and the at least one inverter are to start operating, by switching between: a first operation starting order in which operation of the converter is started after the at least one inverter is put into operation so that a calculated electric power value of the at least one inverter is equal to or higher than a threshold; and a second operation starting order in which operation of the at least one inverter and operation of the converter are started concurrently.

According to the present invention, when the synchronous machine control device including the converter configured to boost the voltage of the direct current power source returns to operation after the operation is stopped, fail-proof return to operation through the prevention of damage to the direct current power source and the shortening of the time required for the return to operation can be balanced.

DESCRIPTION OF THE EMBODIMENTS

A synchronous machine control device according to the present invention and a method of controlling the synchronous machine control device are described below with reference to the drawings through embodiments. In the embodiments, the same or corresponding parts are denoted by the same reference symbols, and overlapping descriptions are omitted.

First Embodiment

Figure 1:
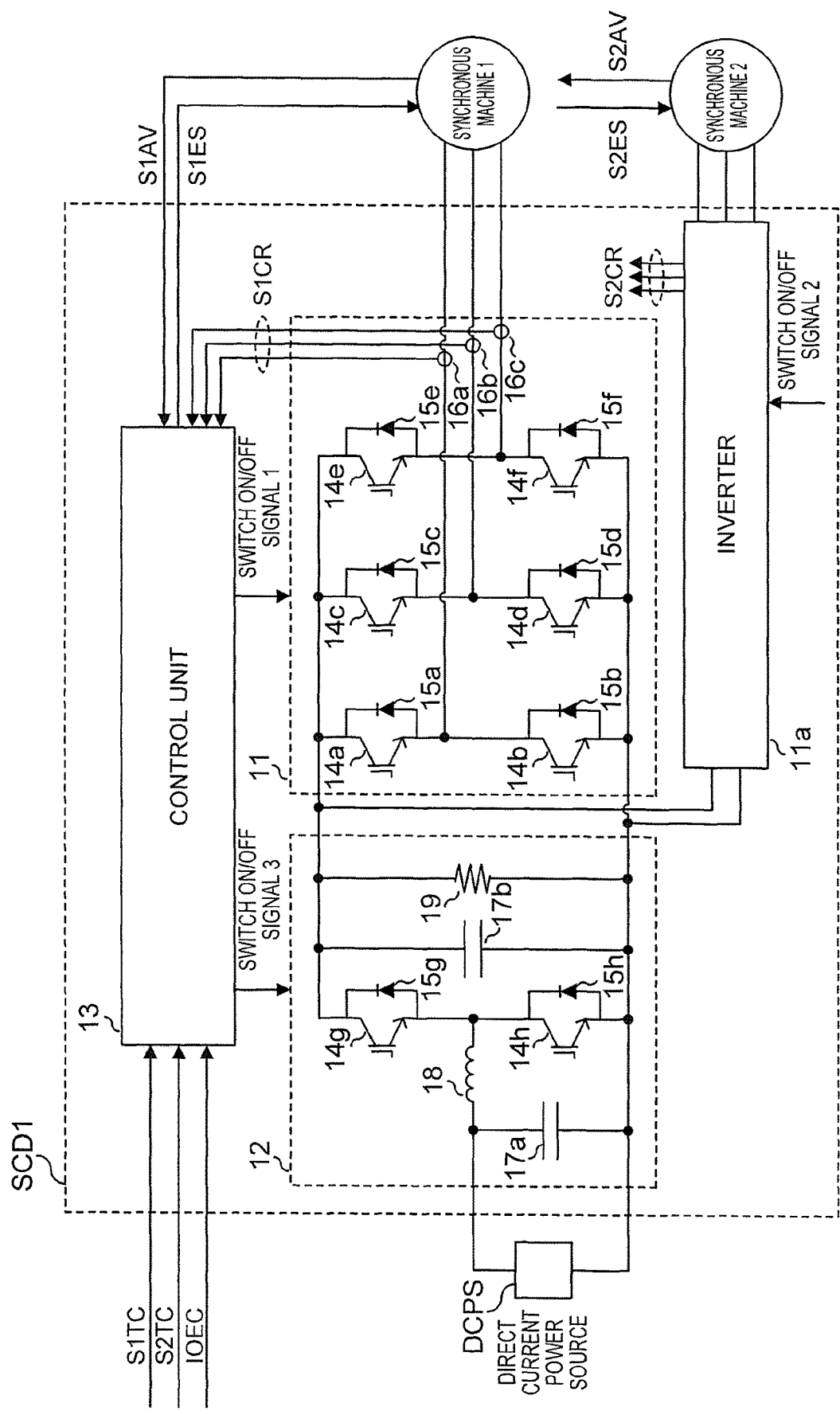
FIG. 1 is a configuration diagram for illustrating an example of a synchronous machine control system in which a synchronous machine control device according to a first embodiment and second embodiment of the present invention is included.

FIG. 1 is a configuration diagram for illustrating an example of a synchronous machine control system in which a synchronous machine control device according to a first embodiment and second embodiment of the present invention is included. The synchronous machine control system includes a direct current power source DCPS, a synchronous machine control device SCD1, and at least one synchronous machine, for example, two synchronous machines 1 and 2.

The synchronous machine control device SCD1 includes inverters 11 and 11a, a converter 12, and a control unit 13.

The inverter 11 converts a direct current voltage of a C2 capacitor 17b, which is described later, into an alternating current voltage, and supplies the alternating current voltage to the synchronous machine 1. The inverter 11 includes switch elements 14a, 14b, 14c, 14d, 14e, and 14f, diodes 15a, 15b, 15c, 15d, 15e, and 15f, and current detectors 16a, 16b, and 16c.

The switch elements 14a, 14b, 14c, 14d, 14e, and 14f are switched on/off by a switch on/off signal 1 from the control unit 13, which is described later.

The diodes 15a, 15b, 15c, 15d, 15e, and 15f allow a current to flow only in one direction (a bottom-to-top direction in FIG. 1). When the switch elements connected to the diodes are insulated-gate bipolar transistors (IGBTs), the diodes allow a current to flow in a direction from the emitter to the collector.

The current detectors 16a, 16b, and 16c detect three-phase currents of the synchronous machine 1 and output the detected currents to the control unit 13.

The inverter 11a converts a direct current voltage of the C2 capacitor 17b described later into an alternating current voltage, and supplies the alternating current voltage to the synchronous machine 2. The inverter 11a has the same configuration as that of the inverter 11.

The converter 12 boosts a direct current voltage of the direct current power source DCPS, and supplies the boosted voltage to the inverters 11 and 11a. The converter 12 includes switch elements 14g and 14h, diodes 15g and 15h, a C1 capacitor 17a, the C2 capacitor 17b, a reactor 18, and a discharge resistor 19.

The C1 capacitor 17a smoothes out a voltage between terminals of the direct current power source DCPS.

The C2 capacitor 17b smoothes out a voltage between terminals of the inverters 11 and 11a.

The discharge resistor 19 is included in order to discharge electric charges in the C2 capacitor 17b when the operation of the synchronous machine control device SCD1 is stopped.

The inverters 11 and 11a have the basic circuit configuration of an inverter, and the converter 12 has the basic circuit configuration of a converter. Detailed descriptions on the circuit configurations of the inverters 11 and 11a and the converter 12 are therefore omitted. Illustrations and detailed descriptions of all but some detectors and other components related to many detection factors in the present invention are also omitted from the following for the sake of convenience.

When an arithmetic processing portion of the control unit 13 is to be configured by software, a computer including a memory in which programs for implementing various functions described later and various types of data necessary to implement the functions are stored and a processor configured to execute processing as indicated by the programs and various types of data stored in the memory can function as the arithmetic processing portion. When the arithmetic processing portion is to be configured by hardware, the arithmetic processing portion is built from at least one digital circuit configured to execute various functions, and various types of accompanying data are incorporated in the digital circuit in advance.

The control unit 13 outputs a synchronous machine 1 excitation signal S1ES to an angle detector built in the synchronous machine 1, and obtains a synchronous machine 1 angle detector output voltage S1AV output from the angle detector (not shown). The control unit 13 generates the switch on/off signal 1 based generally on:

the voltage of the C2 capacitor 17b (C2BV), the three-phase currents of the synchronous machine 1 (S1CR), the synchronous machine 1 angle detector output voltage S1AV, and a synchronous machine 1 torque command S1TC, so that actual torque output from the synchronous machine 1 fulfills the torque command.

Further, the control unit 13 outputs a synchronous machine 2 excitation signal S2ES to an angle detector built in the synchronous machine 2, and obtains a synchronous machine 2 angle detector output voltage S2AV output from the angle detector (not shown). The control unit 13 generates the switch on/off signal 2 based on:

the voltage of the C2 capacitor 17b (C2BV), three-phase currents of the synchronous machine 2 (S2CR), the synchronous machine 2 angle detector output voltage S2AV, and a synchronous machine 2 torque command S2TC, so that actual torque output from the synchronous machine 2 fulfills the torque command.

The control unit 13 calculates a target value of a C2 capacitor voltage C2V with the use of:

the synchronous machine 1 torque command S1TC, a synchronous machine 1 rotational speed S1RS, the synchronous machine 2 torque command S2TC, a synchronous machine 2 rotational speed S2RS, and the C2 capacitor voltage C2V.

The control unit 13 also generates a switch on/off signal 3 so that the actual value of the voltage of the C2 capacitor 17b matches the target value.

Figure 2:
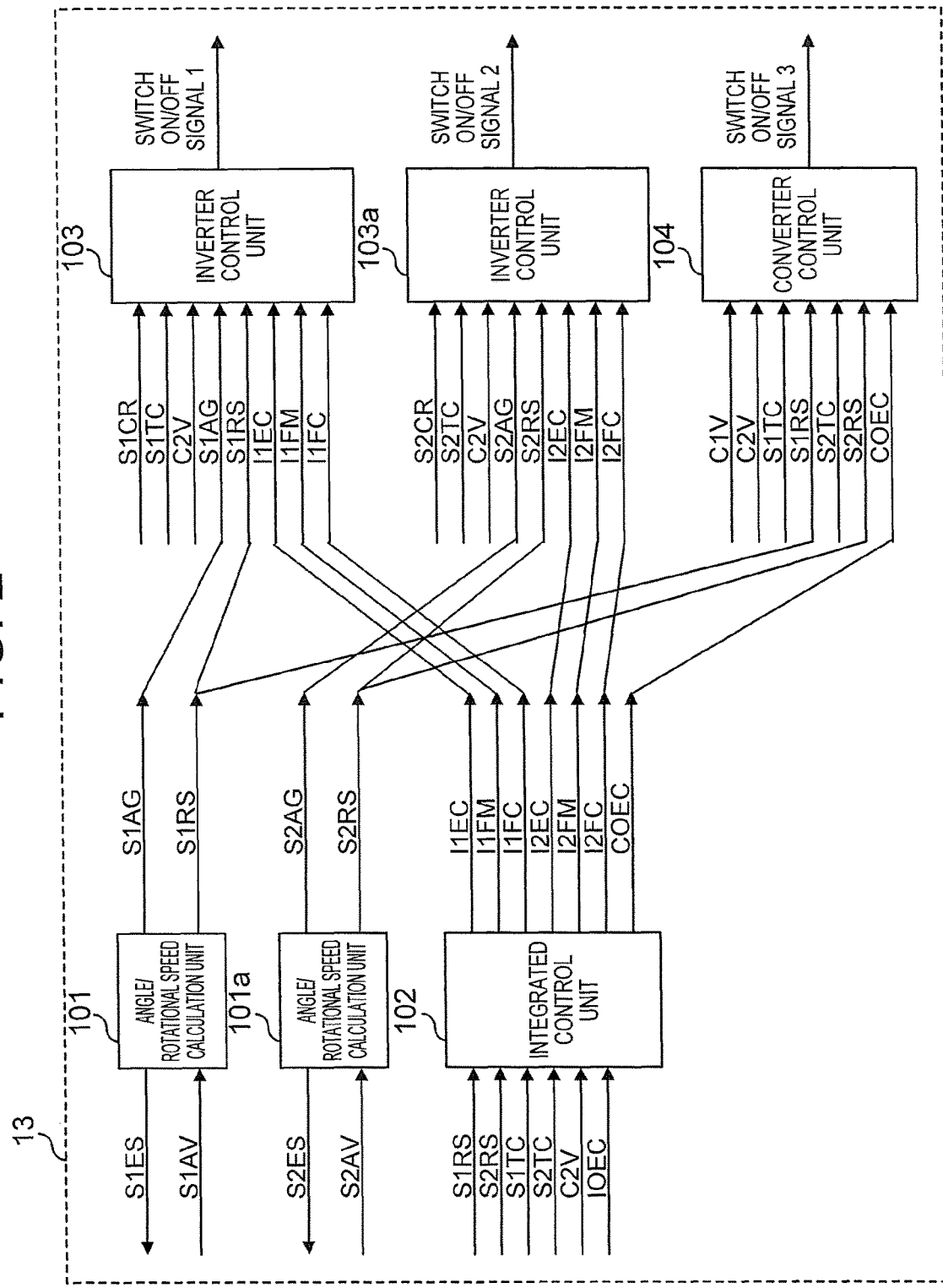
FIG. 2 is a functional block diagram for illustrating an example of the configuration of a control unit in the first embodiment and second embodiment of the present invention.

FIG. 2 is a functional block diagram for illustrating an example of the configuration of the control unit 13 in the first embodiment of the present invention. In FIG. 2, a first angle/rotational speed calculation unit 101 outputs the synchronous machine 1 excitation signal S1ES to the angle detector of the synchronous machine 1, and obtains the synchronous machine 1 angle detector output voltage S1AV from the angle detector. The first angle/rotational speed calculation unit 101 calculates a synchronous machine 1 angle S1AG and the synchronous machine 1 rotational speed S1RS from the synchronous machine 1 angle detector output voltage S1AV.

A second angle/rotational speed calculation unit 101a outputs the synchronous machine 2 excitation signal S2ES to the angle detector of the synchronous machine 2, and obtains the synchronous machine 2 angle detector output voltage S2AV from the angle detector. The second angle/rotational speed calculation unit 101a calculates a synchronous machine 2 angle S2AG and the synchronous machine 2 rotational speed S2RS from the synchronous machine 2 angle detector output voltage S2AV.

Inputs to an integrated control unit 102 are:
the synchronous machine 1 rotational speed S1RS,
the synchronous machine 2 rotational speed S2RS,
the synchronous machine 1 torque command S1TC,
the synchronous machine 2 torque command S2TC,
the C2 capacitor voltage C2V, and
an integrated operation enable command IOEC.

The synchronous machine 1 rotational speed S1RS is obtained from the first angle/rotational speed calculation unit 101.

The synchronous machine 2 rotational speed S2RS is obtained from the second angle/rotational speed calculation unit 101a.

The synchronous machine 1 torque command S1TC, the synchronous machine 2 torque command S2TC, and the integrated operation enable command IOEC are obtained from the outside of the synchronous machine control device SCD1.

The C2 capacitor voltage C2V is obtained from a voltage detector (not shown).

The integrated control unit 102 calculates:
an inverter 1 operation enable command I1EC,
an inverter 1 forcing mode I1FM,
an inverter 1 forcing command I1FC,
an inverter 2 operation enable command I2EC,
an inverter 2 forcing mode I2FM,
an inverter 2 forcing command I2FC, and
a converter operation enable command COEC.

When the C2 capacitor voltage C2V is equal to or higher than a threshold 1, or when the integrated operation enable command IOEC is "prohibited", the integrated control unit 102 outputs:
the inverter 1 operation enable command I1EC: prohibited,
the inverter 2 operation enable command I2EC: prohibited, and
the converter operation enable command COEC: prohibited.

When the C2 capacitor voltage C2V is less than the threshold 1 and the integrated operation enable command IOEC is "permitted", on the other hand, the integrated control unit 102 outputs:
the inverter 1 operation enable command I1EC: permitted,
the inverter 2 operation enable command I2EC: permitted, and
the converter operation enable command COEC: permitted.

However, when a state in which the C2 capacitor voltage C2V is equal to or higher than the threshold 1 or the integrated operation enable command IOEC is "prohibited" changes to a state in which the C2 capacitor voltage C2V is less than the threshold 1 and the integrated operation enable command IOEC is "permitted", and a given condition is established, the converter operation enable command COEC is switched from "prohibited" to "permitted" after a given length of time elapses. Details thereof are described later with reference to FIG. 3.

An inverter control unit 103 generates the switch on/off signal 1 based on:
the synchronous machine 1 three-phase currents S1CR,
the synchronous machine 1 torque command S1TC,
the C2 capacitor voltage C2V,
the synchronous machine 1 angle S1AG,
the synchronous machine 1 rotational speed S1RS,
the inverter 1 operation enable command I1EC,
the inverter 1 forcing mode I1FM, and
the inverter 1 forcing command I1FC.

The synchronous machine 1 three-phase currents S1CR are obtained from the current detectors 16.

The synchronous machine 1 torque command S1TC is obtained from the outside of the synchronous machine control device SCD1.

The C2 capacitor voltage C2V is obtained from the voltage detector (not shown).

The synchronous machine 1 angle S1AG and the synchronous machine 1 rotational speed S1RS are obtained from the first angle/rotational speed calculation unit 101.

The inverter 1 operation enable command I1EC, the inverter 1 forcing mode I1FM, and the inverter 1 forcing command I1FC are obtained from the integrated control unit 102.

When the inverter 1 operation enable command I1EC is "prohibited", the inverter control unit 103 fixes the switch on/off signal to "off".

When the inverter 1 operation enable command I1EC is "permitted" and the inverter 1 forcing mode I1FM is "off", on the other hand, the inverter control unit 103 generates the switch on/off signal 1 so that actual torque output from the synchronous machine 1 fulfills the synchronous machine 1 torque command S1TC, with the use of:
the synchronous machine 1 three-phase currents S1CR,
the C2 capacitor voltage C2V,
the synchronous machine 1 angle S1AG, and
the synchronous machine 1 rotational speed S1RS.

When the inverter 1 operation enable command I1EC is "permitted" and the inverter 1 forcing mode I1FM is "on", the inverter control unit 103 generates the switch on/off signal 1 so that actual torque output from the synchronous machine 1 fulfills the inverter 1 forcing command I1FC, with the use of:
the synchronous machine 1 three-phase currents S1CR,
the C2 capacitor voltage C2V,
the synchronous machine 1 angle S1AG, and
the synchronous machine 1 rotational speed S1RS.

An inverter control unit 103a generates a switch on/off signal 2 based on:
the synchronous machine 2 three-phase currents S2CR,
the synchronous machine 2 torque command S2TC,
the C2 capacitor voltage C2V, the synchronous machine 2 angle S2AG,
the synchronous machine 2 rotational speed S2RS,
the inverter 2 operation enable command I2EC,
the inverter 2 forcing mode I2FM, and
the inverter 2 forcing command I2FC.

The synchronous machine 2 three-phase currents S2CR are obtained from the current detectors 16.
The synchronous machine 2 torque command S2TC is obtained from the outside of the synchronous machine control device SCD1.
The C2 capacitor voltage C2V is obtained from the voltage detector (not shown).
The synchronous machine 2 angle S2AG and the synchronous machine 2 rotational speed S2RS are obtained from the second angle/rotational speed calculation unit 101*a*.
The inverter 2 operation enable command I2EC, the inverter 2 forcing mode I2FM, and the inverter 2 forcing command I2FC are obtained from the integrated control unit 102.

When the inverter 2 operation enable command I2EC is "prohibited", the inverter control unit 103*a* fixes the switch on/off signal 2 to "off".

When the inverter 2 operation enable command I2EC is "permitted" and the inverter 2 forcing command I2FC is "off", on the other hand, the inverter control unit 103*a* generates the switch on/off signal 2 so that actual torque output from the synchronous machine 2 fulfills the synchronous machine 2 torque command S2TC, with the use of:
   the synchronous machine 2 three-phase currents S2CR,
   the C2 capacitor voltage C2V,
   the synchronous machine 2 angle S2AG, and
   the synchronous machine 2 rotational speed S2RS.

When the inverter 2 operation enable command I2EC is "permitted" and the inverter 2 forcing command I2FC is "on", the inverter control unit 103*a* generates the switch on/off signal 2 so that actual torque output from the synchronous machine 2 fulfills the inverter 2 forcing command I2FC, with the use of:
   the synchronous machine 2 three-phase currents S2CR,
   the C2 capacitor voltage C2V,
   the synchronous machine 2 angle S2AG, and
   the synchronous machine 2 rotational speed S2RS.

A converter control unit 104 generates a switch on/off signal 3 based on:
   a C1 capacitor voltage C1V,
   the C2 capacitor voltage C2V,
   the synchronous machine 1 torque command S1TC,
   the synchronous machine 1 rotational speed S1RS,
   the synchronous machine 2 torque command S2TC,
   the synchronous machine 2 rotational speed S2RS, and
   the converter operation enable command COEC.

The C1 capacitor voltage C1V and the C2 capacitor voltage C2V are obtained from the voltage detector (not shown).
The synchronous machine 1 torque command S1TC and the synchronous machine 2 torque command S2TC are obtained from the outside of the synchronous machine control device SCD1.
The synchronous machine 1 rotational speed S1RS is obtained from the first angle/rotational speed calculation unit 101.
The synchronous machine 2 rotational speed S2RS is obtained from the second angle/rotational speed calculation unit 101*a*.
The converter operation enable command COEC is obtained from the integrated control unit 102.

When the converter operation enable command COEC is "prohibited", the converter control unit 104 fixes the switch on/off signal 3 to "off".

When the converter operation enable command COEC is "permitted", on the other hand, the converter control unit 104 calculates a target value of the C2 capacitor voltage C2V from:
   the C1 capacitor voltage C1V,
   the synchronous machine 1 torque command S1TC,
   the synchronous machine 1 rotational speed S1RS,
   the synchronous machine 2 torque command S2TC, and
   the synchronous machine 2 rotational speed S2RS,
and generates the switch on/off signal 3 so that the C2 capacitor voltage C2V reaches the calculated target value, with the use of the C1 capacitor voltage C1V and the C2 capacitor voltage C2V.

Figure 3:
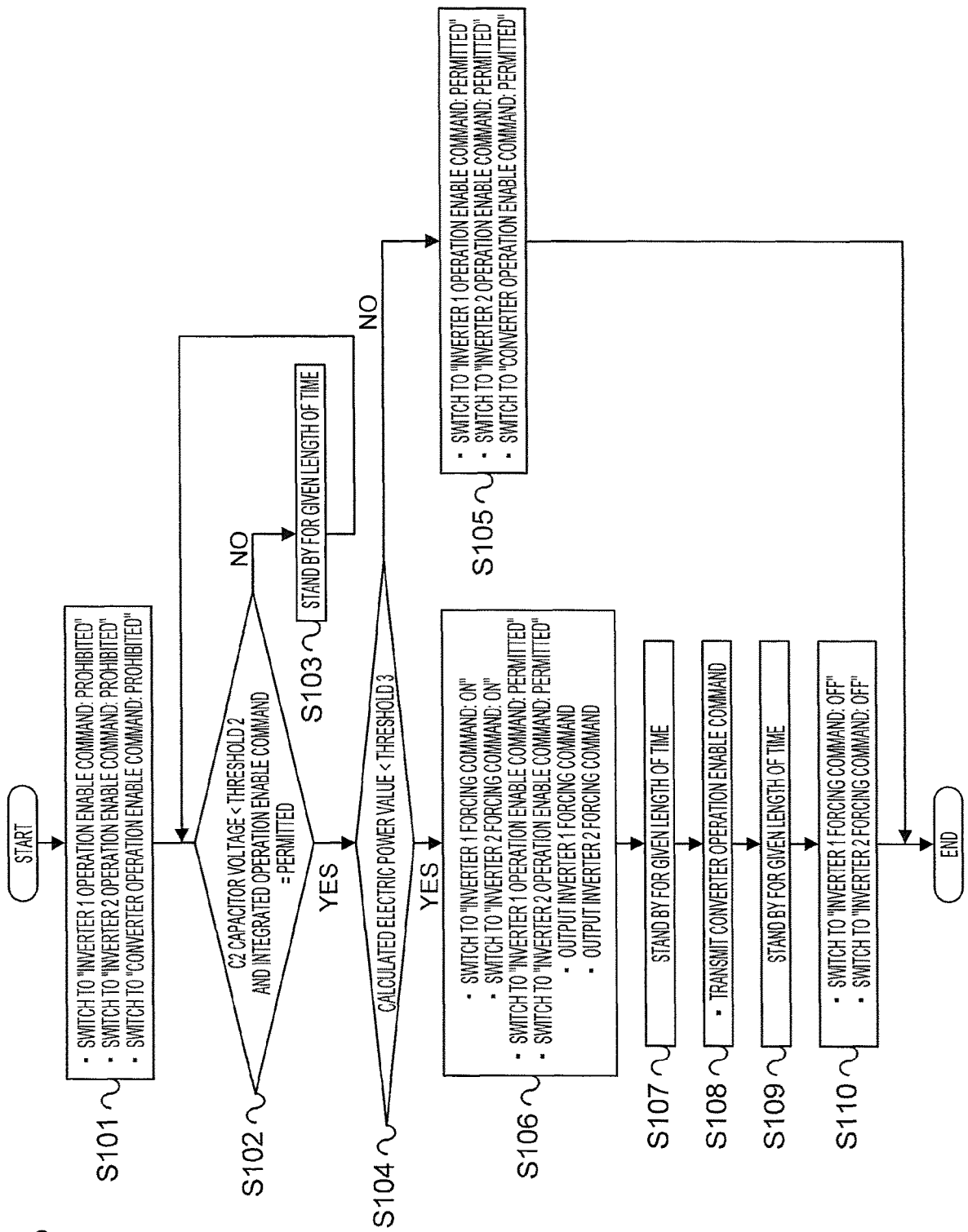
FIG. 3 is a flow chart of the operation of an integrated control unit in the first embodiment of the present invention.

FIG. 3 is a flow chart for illustrating the operation of the integrated control unit 102 in the first embodiment.

When the C2 capacitor voltage C2V reaches the threshold 1 or higher, or when the integrated operation enable command IOEC changes to "prohibited", the operation of Step S101 to Step S109 is executed. The threshold 1 is set to, for example, the lowest value among the withstand voltage of the switch elements 14*a*, 14*b*, 14*c*, 14*d*, 14*e*, 14*f*, 14*g*, and 14*h*, the withstand voltage of the diodes 15*a*, 15*b*, 15*c*, 15*d*, 15*e*, 15*f*, 15*g*, and 15*h*, the withstand voltage of the C1 capacitor 17*a*, and the withstand voltage of the C2 capacitor 17*b*.

In Step S101, the inverter 1 operation enable command I1EC, the inverter 2 operation enable command I2EC, and the converter operation enable command COEC are first switched to "prohibited", and the processing proceeds to Step S102.

In Step S102, whether a condition that the C2 capacitor voltage C2V is less than a threshold 2 and the integrated operation enable command IOEC is "permitted" is fulfilled is determined. The processing proceeds to Step S103 when the condition is not fulfilled, and to Step S104 when the condition is fulfilled. The threshold 2 is set to a value lower than the threshold 1.

In Step S103, the integrated control unit 102 stands by for a given length of time, and the processing then returns to Step S102.

In Step S104, the processing proceeds to Step S105 when a calculated electric power value is equal to or higher than a threshold 3, and to Step S106 when the calculated electric power value is less than the threshold 3.

The threshold 3 may be set to, for example, 0 watt (W). To give another example, when the inverter 11 and the inverter 11*a* operate at a calculated electric power value α (α<0 watt (W)) for a given length of time since the time at which the C2 capacitor voltage C2V is the threshold 2, the threshold 3 may be set to a minimum a at which the C2 capacitor voltage C2V does not exceed the threshold 1. The calculated electric power value is calculated, for example, from:
   the synchronous machine 1 rotational speed S1RS,
   the synchronous machine 1 torque command S1TC,
   the synchronous machine 2 rotational speed S2RS, and
   the synchronous machine 2 torque command S2TC,
from Expression (1).

$$\text{(Calculated electric power value)} = \text{(synchronous machine 1 rotational speed)} \times (2\pi/60) \times \text{(synchronous machine 1 torque command)} + \text{(synchronous machine rotational speed)} \times (2\pi/60) \times \text{(synchronous machine 2 torque command)} \quad (1)$$

Another example of how to calculate the calculated electric power value involves storing, in a map format, the loss of the synchronous machine 1 and the loss of the inverter 11, which vary depending on the synchronous machine 1 rotational speed S1RS and the synchronous machine 1 torque command S1TC, and the loss of the synchronous machine 2 and the loss of the inverter 11a, which vary depending on the synchronous machine 2 rotational speed S2RS and the synchronous machine 2 torque command S2TC, calculating the loss of the synchronous machine 1 and the loss of the inverter 11 from the synchronous machine 1 rotational speed S1RS and the synchronous machine 1 torque command S1TC by mapping, calculating the loss of the synchronous machine 2 and the loss of the inverter 11a from the synchronous machine 2 rotational speed S2RS and the synchronous machine 2 torque command S2TC by mapping, and calculating the calculated electric power value by Expression (2).

(Calculated electric power value)=(synchronous machine 1 rotational speed)×$(2\pi/60)$×(synchronous machine 1 torque command)+(synchronous machine 2 rotational speed)×$(2\pi/60)$×(synchronous machine 2 torque command)+(loss of synchronous machine 1)+(loss of inverter 11)+(loss of synchronous machine 2)+(loss of inverter 11a)  (2)

In Step S105, the inverter 1 operation enable command I1EC, the inverter 2 operation enable command I2EC, and the converter operation enable command COEC are switched to "permitted", and the processing is ended.

In Step S106, the inverter 1 forcing command I1FC and the inverter 2 forcing command I2FC are switched to "on", and the inverter 1 operation enable command I1EC and the inverter 2 operation enable command I2EC are switched to "permitted". The inverter 1 forcing command I1FC and the inverter 2 forcing command I2FC are output.

The inverter 1 forcing command I1FC and the inverter 2 forcing command I2FC may both be set to, for example, a value equal to or higher than 0 (Nm). To give another example, the inverter 1 forcing command I1FC and the inverter 2 forcing command I2FC may be set so that a calculated electric power value expressed by Expression (3) is equal to or higher than the threshold 3.

(Calculated electric power value)=(synchronous machine 1 rotational speed)×$(2\pi/60)$×(inverter 1 forcing command)+(synchronous machine 2 rotational speed)×$(2\pi/60)$×(inverter 2 forcing command)  (3)

In Step S107, the integrated control unit 102 stands by for a given length of time, and the processing then proceeds to Step S108. The standby time in this step is set to, for example, the larger value of:

the length of time until actual torque that fulfills the inverter forcing command is output since the switch of the inverter 1 operation enable command I1EC to "permitted", and the length of time until actual torque that fulfills the inverter forcing command is output since the switch of the inverter 2 operation enable command I2EC to "permitted".

In Step S108, "converter operation enable command COEC: prohibited" is transmitted, and the processing proceeds to Step S109.

In Step S109, the integrated control unit 102 stands by for a given length of time, and the processing then proceeds to Step S110. The standby time in this step is set to, for example, the length of time required for the C2 capacitor voltage C2V of the converter 12 to reach a value that fulfills the command. When the C2 capacitor voltage C2V is equal to or less than the C1 capacitor voltage C1V, the standby time is set to, for example, the length of time until the switch element 14g is fixed to an "on" state and the switch element 14h is fixed to an "off" state.

In Step S110, the inverter 1 forcing command I1FC and the inverter 2 forcing command I2FC are switched to "off", the inverters 11 and 11a are returned to a normal operation state, and the processing is ended.

In the method of Japanese Patent Application Laid-open No. 2008-154371, when the inverters 11 and 11a and the converter 12 are to resume operation, the inverters 11 and 11a are first put into operation with the regenerative operation prohibited, and the converter 12 is subsequently put into operation, irrespective of the values of:

the synchronous machine 1 rotational speed S1RS,
the synchronous machine 1 torque command S1TC,
the synchronous machine 2 rotational speed S2RS, and
the synchronous machine 2 torque command S2TC.

The method allows the inverters 11 and 11a to execute the regenerative operation only after the operation of the converter 12 is started, with the result that the resumption of operation is delayed by that period of time.

In contrast, the synchronous machine control device according to the first embodiment starts the operation of the inverters 11 and 11a and the converter 12 without prohibiting the regenerative operation, as long as the calculated electric power value is less than the threshold 3, which means faster return to operation than in the method of Japanese Patent Application Laid-open No. 2008-154371.

In the manner described above, the synchronous machine control device according to the first embodiment can balance the fail-proof start of the operation of the synchronous machines and the shortening of the time required to start the operation when the synchronous machines are to start operating.

Second Embodiment

The synchronous machine control device according to the first embodiment concurrently switches the inverter 1 operation enable command I1EC, the inverter 2 operation enable command I2EC, and the converter operation enable command COEC to "permitted" when the calculated electric power value that is calculated in Step S104 is equal to or higher than the threshold 3. This leaves a chance that the operation of the converter 12 starts earlier than the operation of the inverter 11 and the inverter 11a. When the synchronous machine 1 or the synchronous machine 2 is operating at a high rotational speed with the direct current power source DCPS charged to full capacity, the inverter 11 or the inverter 11a may fall into a full wave rectification state, thereby causing a regenerative current to flow in the direct current power source DCPS and damaging the direct current power source DCPS.

A synchronous machine control device according to a second embodiment of the present invention prevents a regenerative current from flowing in the direct current power source DCPS and damaging the direct current power source DCPS when the synchronous machine 1 or the synchronous machine 2 is operating at a high rotational speed, by putting the inverter 11 and the inverter 11a into operation at a calculated electric power value of the inverters 11 and 11a that is equal to or higher than the threshold 3 before the converter 12 starts operating.

The synchronous machine control device according to the second embodiment has the same configuration as that of the synchronous machine control device according to the first embodiment, which is illustrated in FIG. 1 and FIG. 2.

Figure 4:
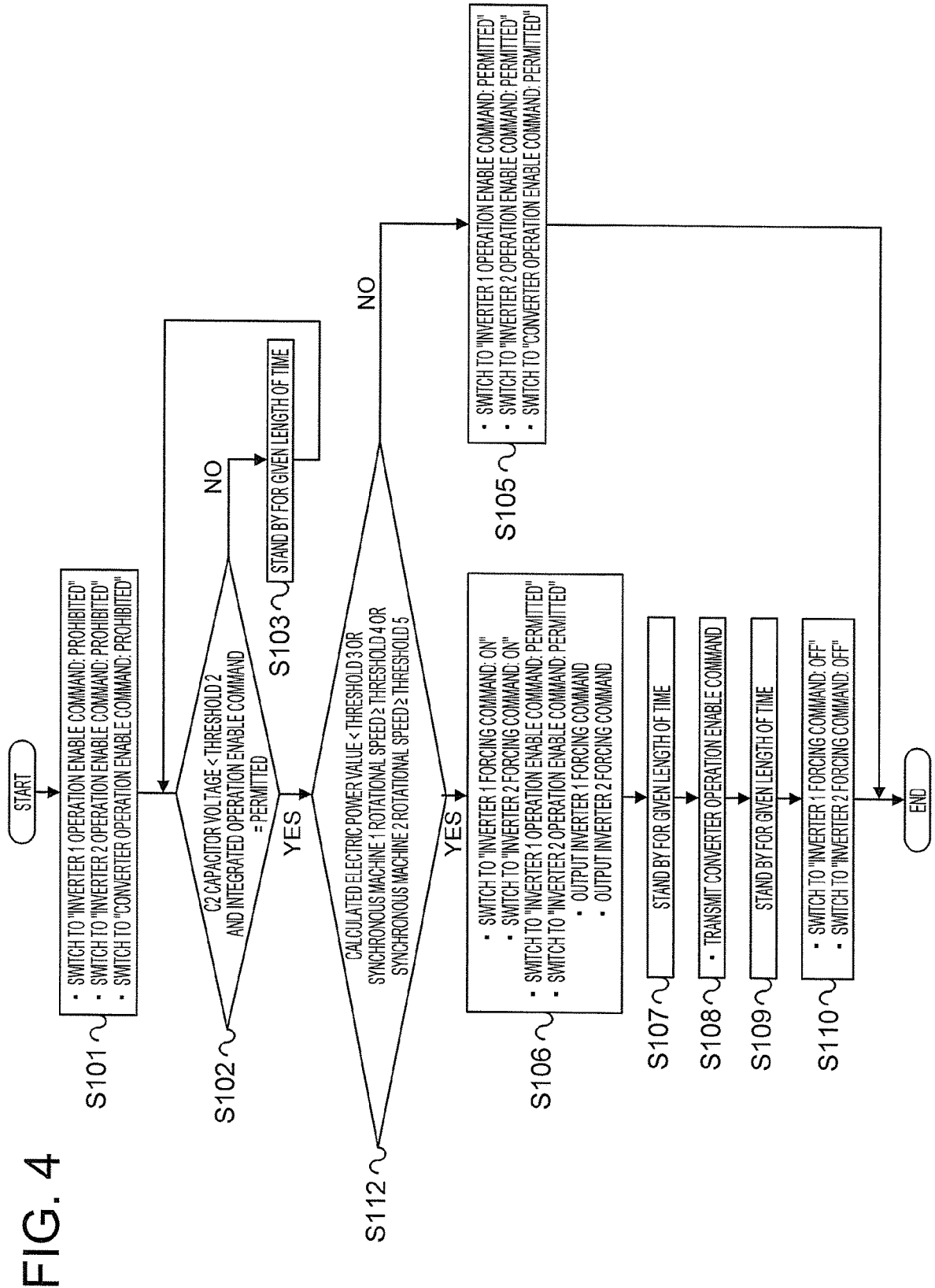
FIG. 4 is a flow chart of the operation of an integrated control unit in the second embodiment of the present invention.

FIG. 4 is a flow chart for illustrating the operation of the integrated control unit 102 of the synchronous machine control device according to the second embodiment. The operation of the integrated control unit 102 of the second embodiment is substantially the same as the operation of the integrated control unit 102 of the first embodiment, which is illustrated in FIG. 3. The difference is that the processing executed in Step S104 by the integrated control unit 102 of the first embodiment and illustrated in FIG. 3 is executed by the integrated control unit 102 of the second embodiment as a part of processing executed in Step S112 and illustrated in FIG. 4.

In Step S112, the processing proceeds to Step S106 when the calculated electric power value is less than the threshold 3, when the synchronous machine 1 rotational speed S1RS is equal to or higher than a threshold 4, or when the synchronous machine 2 rotational speed S2RS is equal to or higher than a threshold 5, and proceeds to Step S105 when the condition is not fulfilled.

The threshold 4 is set to, for example, a rotational speed at which an induced voltage generated by the rotation of the synchronous machine 1 exceeds the voltage of the direct current power source DCPS.

The threshold 5 is set to, for example, a rotational speed at which an induced voltage generated by the rotation of the synchronous machine 2 exceeds the voltage of the direct current power source DCPS.

The synchronous machine control device according to the second embodiment starts the operation of the converter 12 after the inverter 11 and the inverter 11a are put into operation so that the calculated electric power value of the inverters 11 and 11a is equal to or higher than the threshold 3, also when the rotational speed of the synchronous machine 1 and the rotational speed of the synchronous machine 2 are equal to or higher than their respective thresholds. Consequently, the operation of the converter 12 starts earlier than the operation of the inverter 11 and the inverter 11a as in the synchronous machine control device according to the first embodiment, which prevents a regenerative current from flowing in the direct current power source DCPS and damaging the direct current power source DCPS.

In the manner described above, the synchronous machine control device according to the second embodiment can prevent a regenerative current from flowing in the direct current power source and damaging the direct current power source when the synchronous machines start operating.

Figure 5:
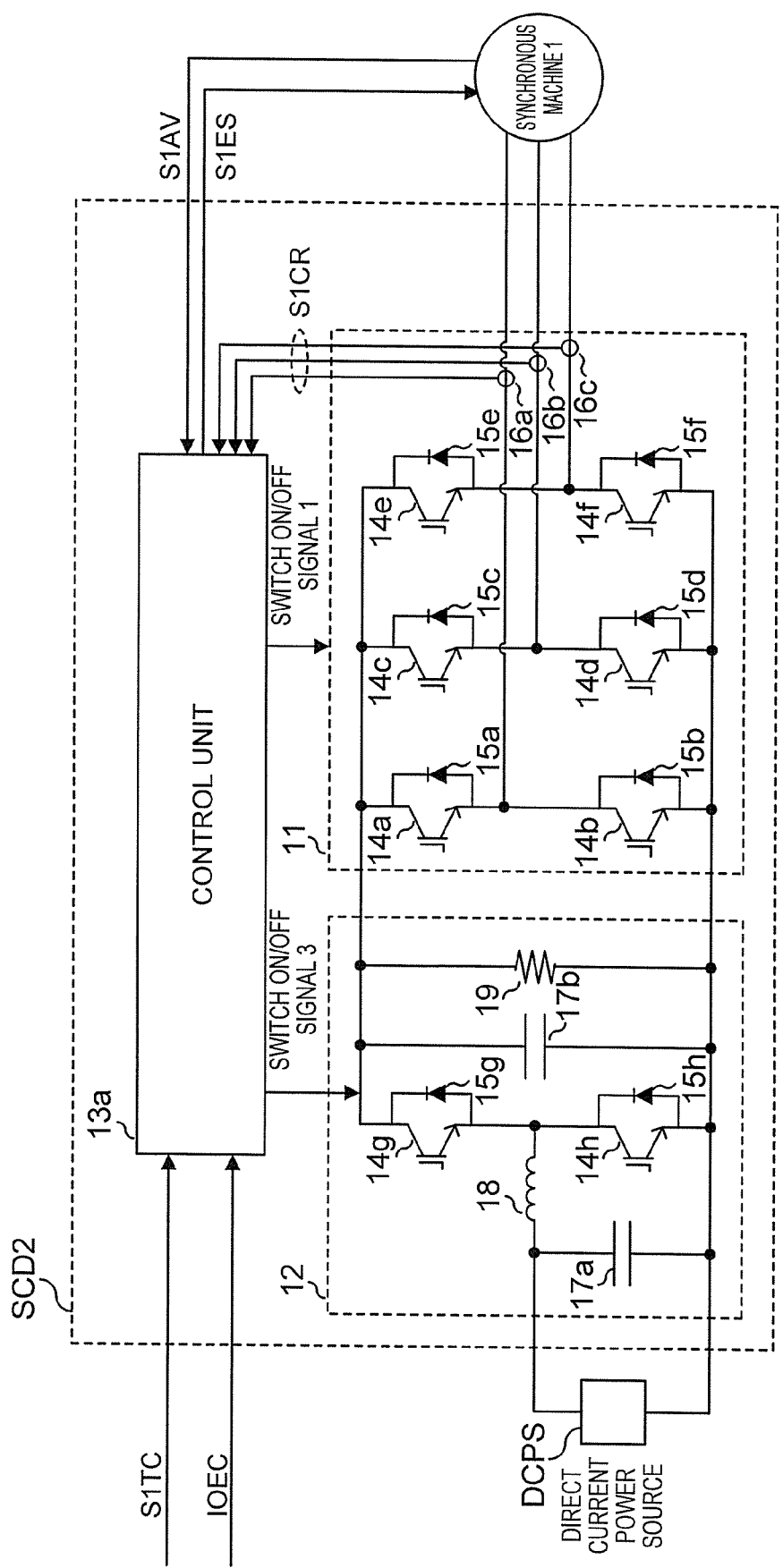
FIG. 5 is a configuration diagram for illustrating an example of a synchronous machine control system in which a synchronous machine control device according to another mode of the first embodiment and second embodiment of the present invention is included.

While the first embodiment and the second embodiment take as an example the case illustrated in FIG. 1 in which two synchronous machines and two inverters are included, it is sufficient if at least one synchronous machine and at least one inverter are included. For instance, the number of synchronous machines included and the number of inverters included may be one as in a synchronous machine control device SCD2, which is illustrated in FIG. 5.

Figure 6:
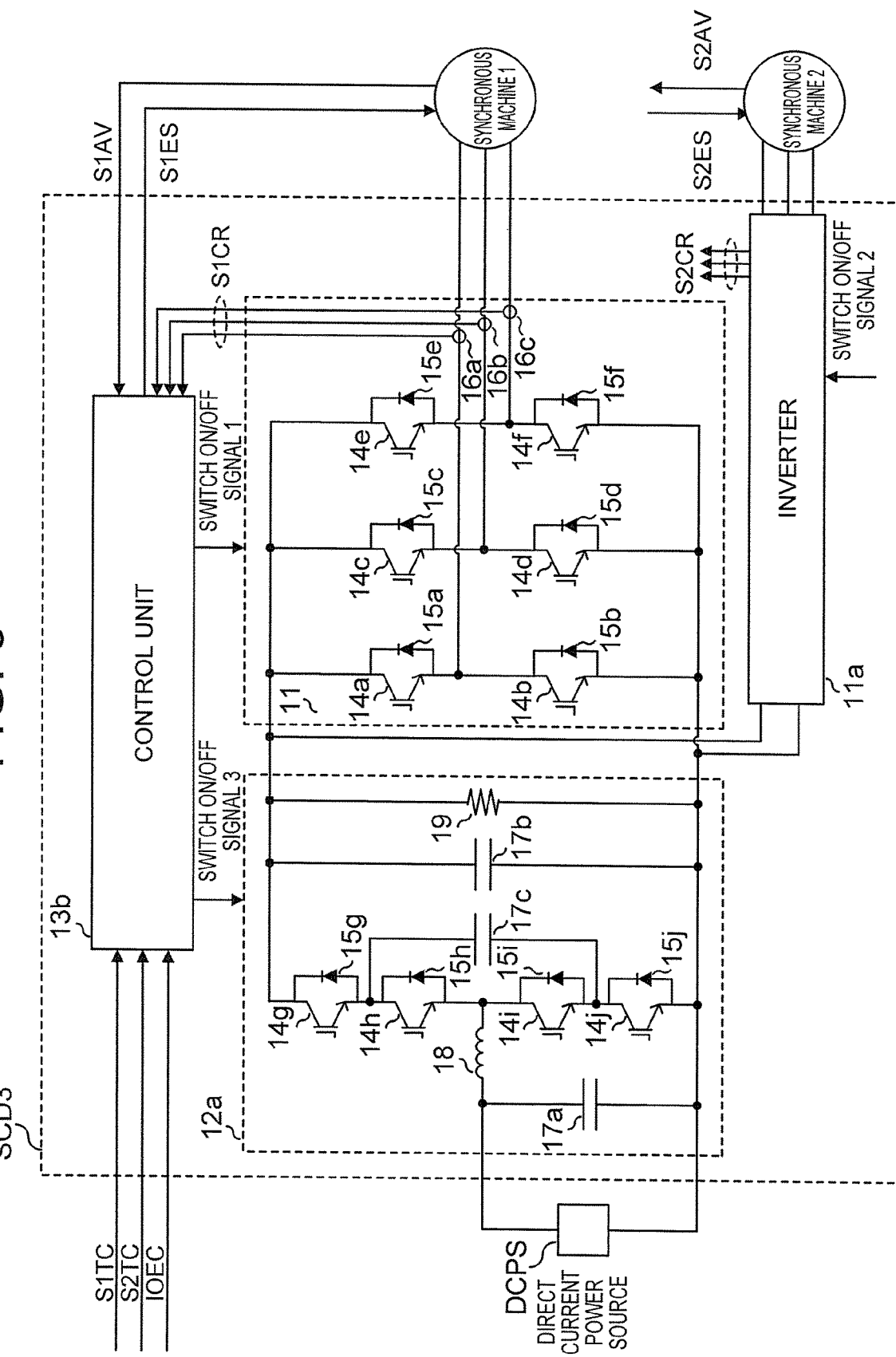
FIG. 6 is a configuration diagram for illustrating an example of a synchronous machine control system in which a synchronous machine control device according to still another mode of the first embodiment and second embodiment of the present invention is included.

The converter may have the configuration of a converter 12a of a synchronous machine control device SCD3, which is illustrated in FIG. 6. In the converter 12a, a switch circuit including upper switch elements, which are connected to the power source side of the inverters, and diodes and a switch circuit including lower switch elements, which are connected to the earth side of the inverters, and diodes are each built by connecting two switch circuits in series, and the power source side of the switch element 14h and the earth side of the switch element 14i are connected to a capacitor 17c.

Figure 7:
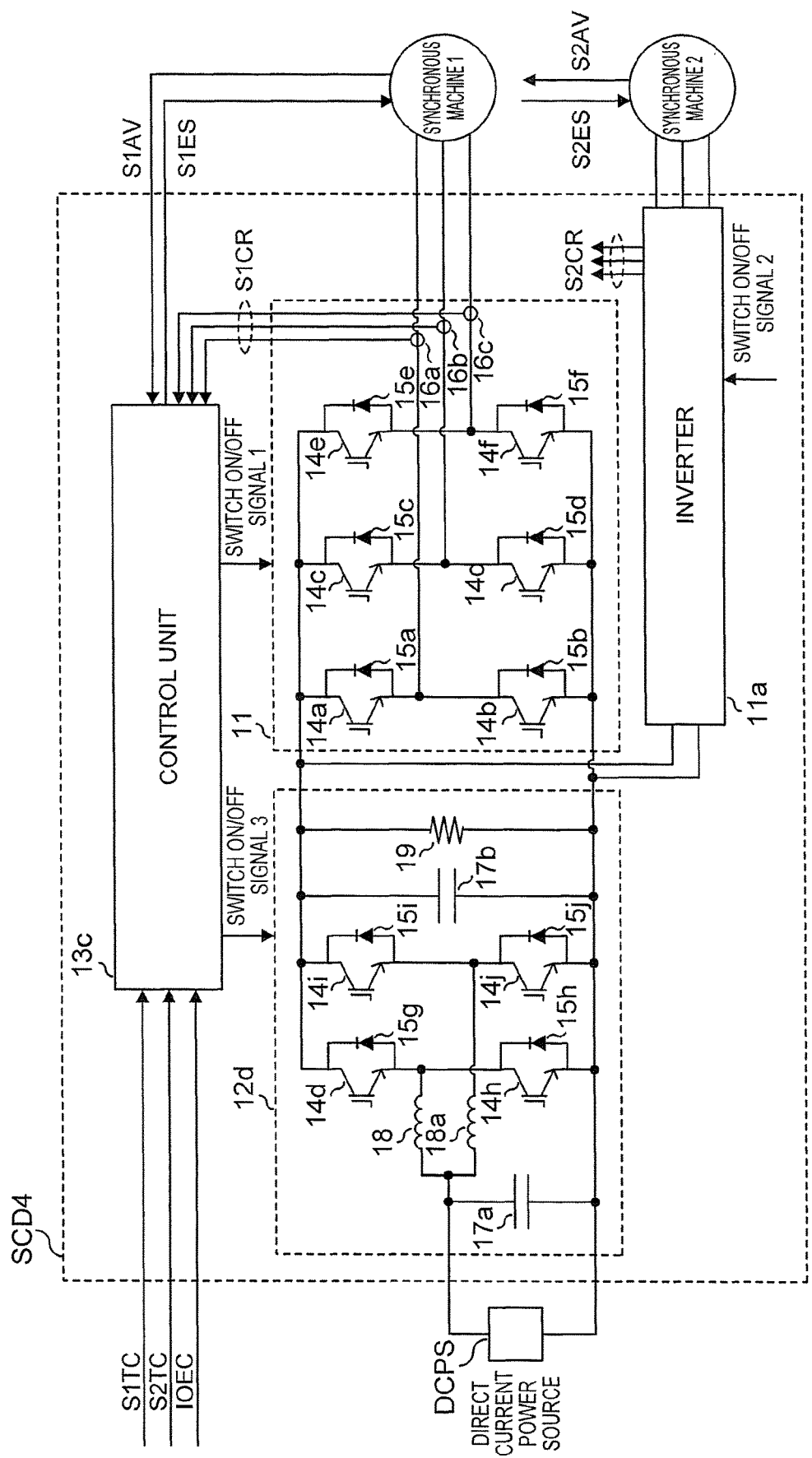
FIG. 7 is a configuration diagram for illustrating an example of a synchronous machine control system in which a synchronous machine control device according to yet still another mode of the first embodiment and second embodiment of the present invention is included.

The converter may also have the configuration of, for example, a converter 12b of a synchronous machine control device SCD4, which is illustrated in FIG. 7. In the converter 12b, two converter circuits each including two switch circuits connected in series and one reactor are connected in parallel.

What is claimed is:

1. A synchronous machine control device, comprising:
a converter configured to boost a direct current voltage;
at least one inverter configured to supply power to a synchronous machine by converting the boosted direct current voltage into an alternating current voltage; and
a control unit configured to control the converter and the at least one inverter,
wherein the control unit includes an integrated control unit configured to switch, when the converter and the at least one inverter are to start operating from a state where operation of the converter and operation of the at least one inverter are stopped, an order in which the operation of the converter and the operation of the at least one inverter are started, and
wherein the integrated control unit is configured to perform control, when the converter and the at least one inverter are to start operating, by switching between:
a first operation starting order in which, in a case where a calculated electric power value calculated from a rotational speed and a torque command of the at least one inverter is less than a first threshold, operation of the converter is started after the at least one inverter is put into operation by changing the torque command so that the calculated electric power value of the at least one inverter is equal to or higher than a second threshold; and
a second operation starting order in which, in a case where a calculated electric power value calculated from the rotational speed and the torque command of the at least one inverter is equal to or higher than the first threshold, operation of the at least one inverter and operation of the converter are started concurrently.

2. The synchronous machine control device according to claim 1, wherein the integrated control unit is configured to switch between the first operation starting order and the second operation starting order based on a calculated electric power value that is calculated from a rotational speed of the synchronous machine and from a torque command.

3. The synchronous machine control device according to claim 1, wherein the integrated control unit is configured to switch between the first operation starting order and the second operation starting order based on a calculated electric power value that is calculated from a rotational speed of the synchronous machine and from a torque command, and on the rotational speed of the synchronous machine.

4. The synchronous machine control device according to claim 1, wherein when the converter and the at least one inverter are to start operating is a condition that immediately follows a condition where both the converter and at least one inverter are in an off state.

5. A method of controlling a synchronous machine control device,
the synchronous machine control device including:
a converter configured to boost a direct current voltage; and at least one inverter configured to supply power to a synchronous machine by converting the boosted direct current into an alternating current voltage, the method comprising performing, when the converter and the at least one inverter are to start operating from a state where operation of the converter and operation of the at least one inverter are stopped, control by switching between:

a first operation starting order in which, in a case where a calculated electric power value calculated from a rotational speed and a torque command of the at least one inverter is less than a first threshold, operation of the converter is started after the at least one inverter is put into operation by changing the torque command so that the calculated electric power value of the at least one inverter is equal to or higher than a second threshold; and a second operation starting order in which, in a case where a calculated electric power value calculated from the rotational speed and the torque command of the at least one inverter is equal to or higher than the first threshold, operation of the at least one inverter and operation of the converter are started concurrently.

6. The method of claim 5, wherein when the converter and the at least one inverter are to start operating is a condition that immediately follows a condition where both the converter and at least one inverter are in an off state.

* * * * *